United States Patent [19]

Grosseau

[11] 3,831,966

[45] Aug. 27, 1974

[54] AUTOMOBILE SUSPENSIONS

[75] Inventor: Albert Grosseau, Chaville/Hauts-de-Seine, France

[73] Assignee: Societe Anonyme Automobiles Citroen, Paris, France

[22] Filed: June 19, 1972

[21] Appl. No.: 264,258

[30] Foreign Application Priority Data
June 23, 1971 France .............................. 71.22914

[52] U.S. Cl. ......................... 280/124 B, 267/57.1 A
[51] Int. Cl. ............................................ B60g 11/20
[58] Field of Search ....... 280/124 B; 267/57, 57.1 A

[56] References Cited
UNITED STATES PATENTS

| | | | |
|---|---|---|---|
| 2,977,132 | 3/1961 | Bainbridge ..................... | 280/124 B |
| 3,701,542 | 10/1972 | Grosseau ......................... | 280/124 B |

*Primary Examiner*—Philip Goodman
*Assistant Examiner*—John A. Carroll
*Attorney, Agent, or Firm*—Fitzpatrick, Cella, Harper & Scinto

[57] ABSTRACT

This invention relates to a suspension of a group of wheels of a vehicle, comprising two wheels located respectively on either side of the longitudinal plane of this vehicle and two suspension devices, each being constituted by at least one anti-roll bar and belonging to one of the two wheels, whilst each wheel is connected to one end of its suspension device and an elastic member is fixed to each of the ends of the suspension devices opposite the ends connected to the wheels, by coupling means, which are distinct from said elastic member and which are constituted by a part comprising two support elements between which the elastic member is disposed and by a member for fixing the suspension device in question to said coupling means, wherein the part comprising the two support elements is constituted by an arm which is provided on the one hand with the fixing member, on the other hand with a swell constituting a first of the two elements for supporting said part on a first face of the elastic member, and by a tie-rod integral with the arm and provided with a shoulder which is distant from the face of the arm provided with the swell, disposed opposite the said face and which constitutes the second of the two support elements of the part on a second face of the elastic member, which is opposite the first afore-mentioned face of said elastic member. The suspension described is applicable in particular to the manufacture of automobile vehicles.

8 Claims, 7 Drawing Figures

AUTOMOBILE SUSPENSIONS

The present invention relates to the suspension of a group of wheels provided with an assembly tie-rod.

In the field of wheel suspension systems in a vehicle, devices are already known which are satisfactory in operation both from the point of view of their easy mounting and their efficient functioning.

The suspension described in U.S. Pat. No. 3,701,542 presents the advantages which have been specified in the corresponding description.

However, one may wish to be able to facilitate the complementary adjustments of suspension, as well as to improve the actual mounting of the suspension. To this end, a new suspension must be adopted, which is precisely the object of the present invention.

The present invention thus relates to a suspension of a group of wheels of a vehicle, comprising two wheels located respectively on either side of the longitudinal plane of this vehicle and two suspension devices, each being constituted by at least one torsion bar and belonging to one of the two wheels. Each wheel is connected to one end of its suspension device, whilst an elastic member is fixed to each of the ends of the suspenion devices opposite the ends connected to the wheels, by coupling means, which are distinct from said elastic member and which are constituted by a part comprising two support elements between which the elastic member is disposed and by a member for fixing the suspension device in question to said coupling means.

The part comprising the two support elements is constituted by an arm which is provided, on the one hand, with the fixing member, on the other hand with a swell constituting the first of the two support elements of said part on a first face of the elastic member, and by a tie-rod integral with the arm, and provided with a shoulder, which is distant from the face of the arm provided with the swell, which is disposed opposite said face and which constitutes the second of the two support elements of the part on a second face of the elastic member, which is opposite the first afore-mentioned face of said elastic member.

The distance separating the shoulder from the face of the arm disposed opposite is advantageously adjustable, by a means known per se.

The tie-rod is thus preferably provided with a threaded end, whilst the shoulder is itself constituted by a nut screwed on said threaded end.

In this case, a support plate is advantageously interposed between the nut and the second face of the elastic member.

An orifice, made at each end of the elastic member, allows the passage of the tie-rod through said elastic member.

A clearance is preferably made between the walls of the orifice and the rod penetrating therein.

Finally, the orifice is advantageously constituted of a notch which opens out on the periphery of the elastic member.

When the end of each of the suspension devices to which the part is fixed by a fixing member, is disposed inside a side-member of the vehicle, and when said side-member comprises an opening, through which the arm passes, an elastic bearing is advantageously interprosed at right angles to said opening between said side-member and said arm.

In a variant embodiment of this suspension, the fixing member is disposed on the arm of the same side as the swell with respect to the tie-rod.

This fixing device is then preferably disposed substantially at right angles to the swell with respect to the first face of the elastic member.

Furthermore, one of the ends of the arm may advantageously extend into a fork with two prongs, the distance between the inner faces of which is at least equal to the diameter of the tie-rod.

The end of the tie-rod opposite the shoulder is, in this case, provided with a head, one of the faces of which is cylindrical and cooperates with a likewise cylindrical recess made in the face of the arm opposite that provided with the swell and the axis of which is substantially parallel to that of the torsion bars.

In addition, a complementary part is often integral with the elastic member and comprises two stops between which the arm is inserted, so that the faces of said arm perpendicular to the torsion bar are disposed opposite said stops.

This complementary part, in a preferred embodiment, comprises two flanges edges which cover, at least partially, the two faces of the elastic member substantially perpendicular to the torsion bars and is maintained in position on said member by means of the tie-rod itself.

Finally, when the elastic member extends on either side of at least one panel of the structure of the vehicle, such as the panel of a side-member, an opening being made to this end in said panel, it is advantageous if an elastic bearing is interposed between this panel and said elastic member.

The invention will be more readily understood upon reading the following description, with reference to the accompanying drawings, in which.

Figure 1:
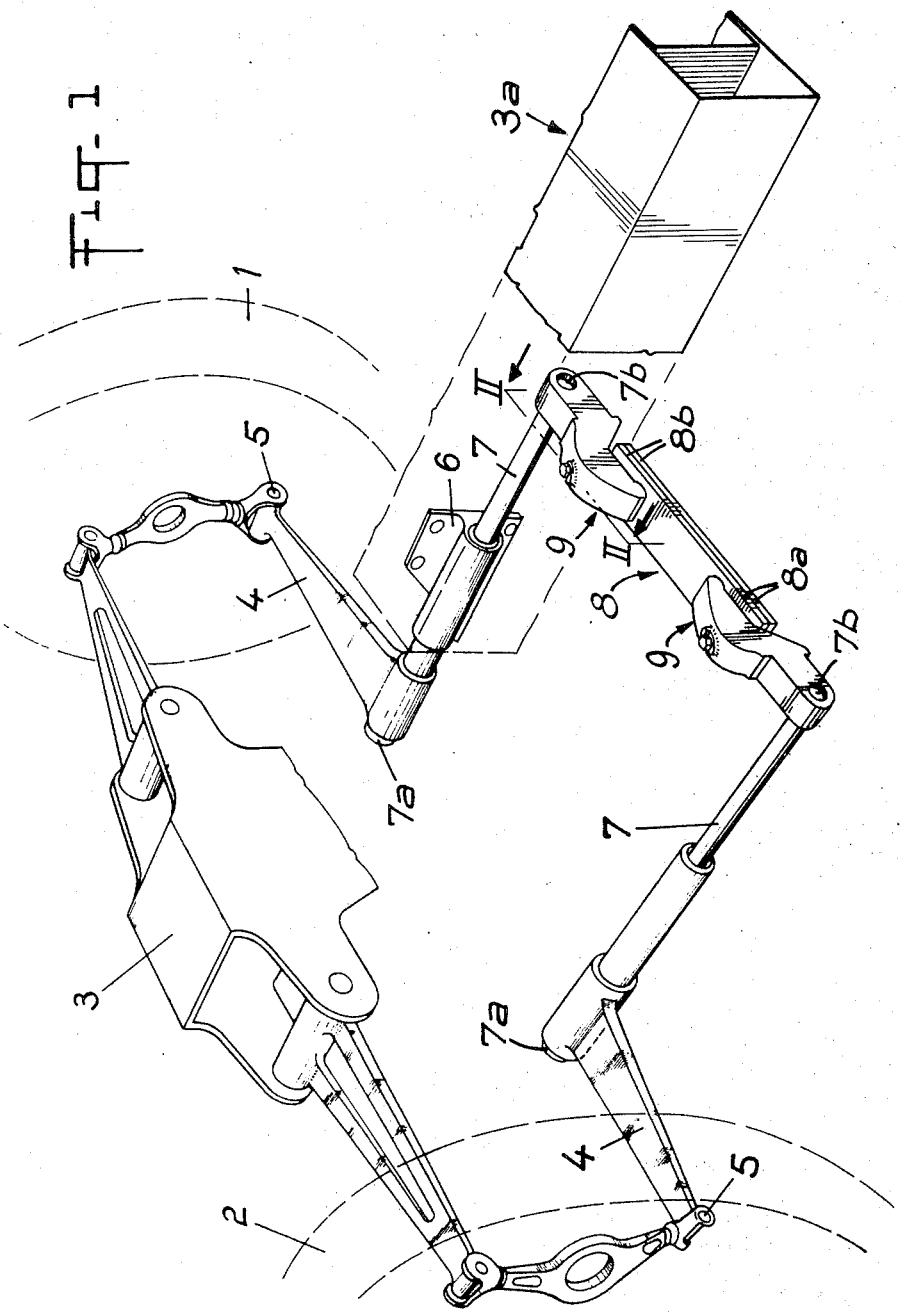
FIG. 1 is a partial view, in perspective, of a suspension in accordance with the invention.

Referring now to the drawings, FIG. 1 shows the suspension on its front wheels, right 1 and left 2, of the structure 3 of a vehicle. The suspension arms 4 are connected to the wheels by joints 5 and are mounted to rotate on the side-members 3a of the structure 3, by means of bearings 6.

A torsion bar 7 is imbedded by its end 7a in each of the arms 4 and is held in place in the housing by a locking device.

The ends 7b of the bars 7, opposite ends 7a, are connected to the ends 8a and 8b of an elastic anti-roll member in the form of leaves 8, by means of two devices 9.

Figure 3:
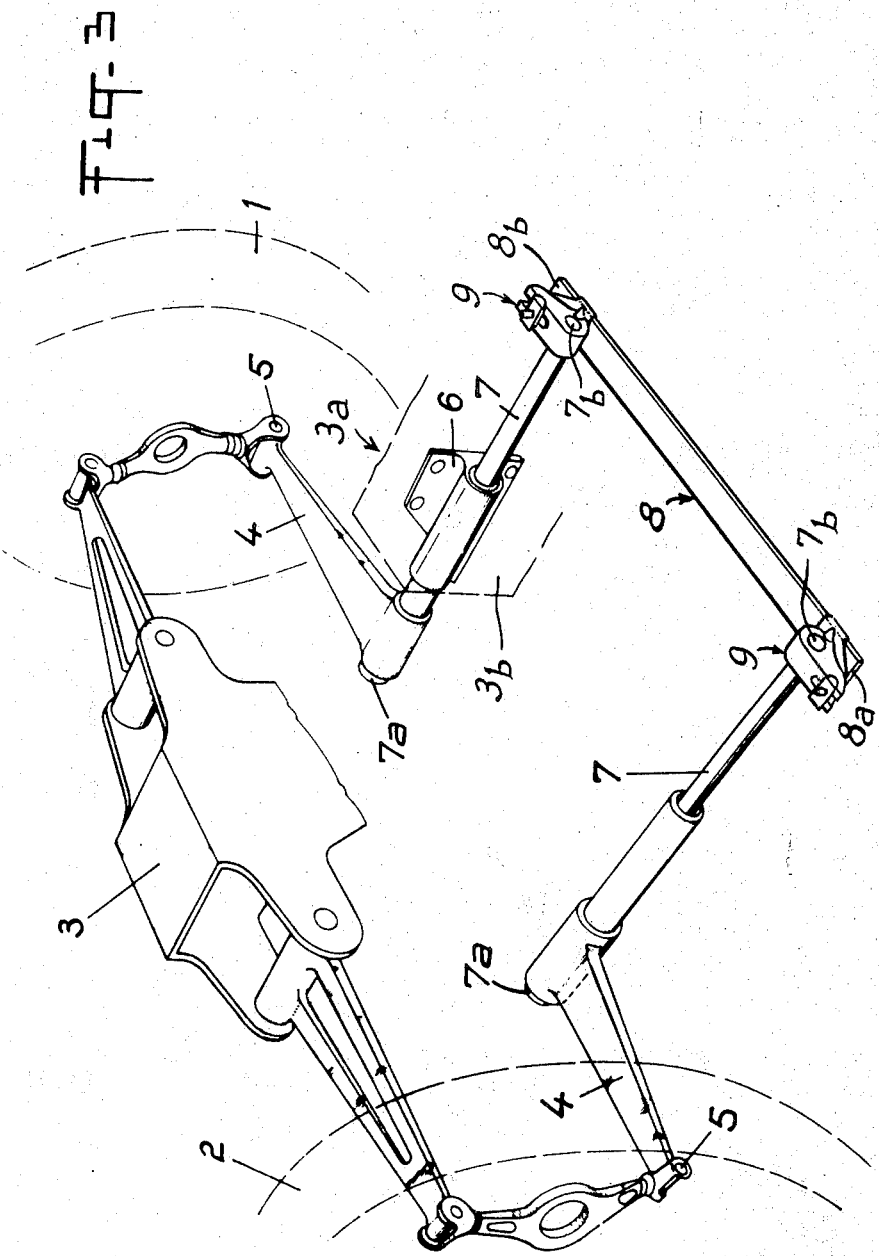
FIG. 3 is a part view in perspective of a variant suspension in accordance with the invention.
Figure 4:
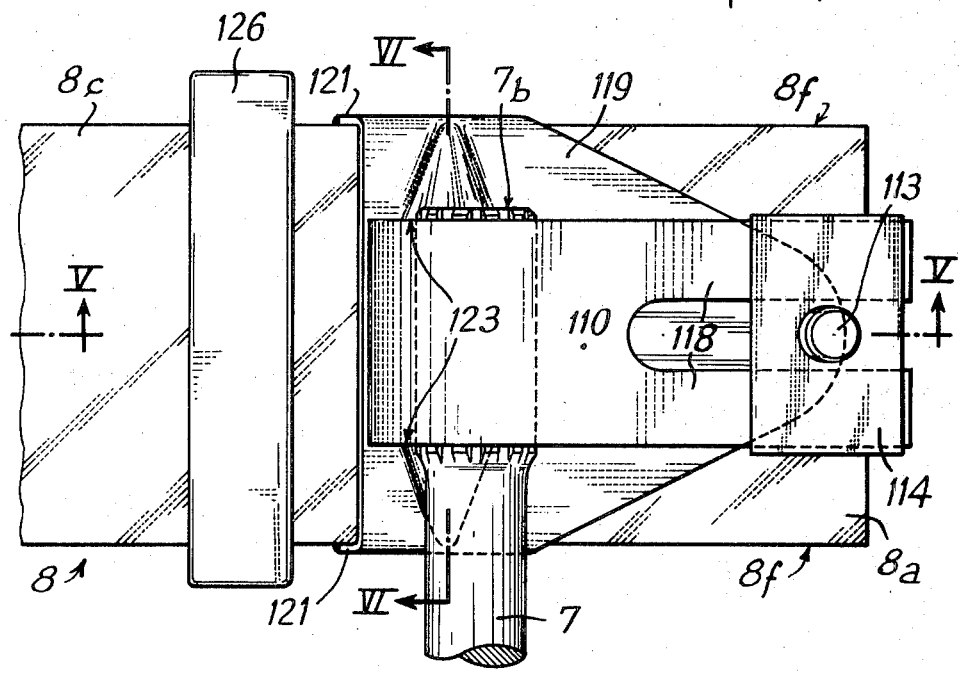
FIG. 4 is a part view in plan of the suspension of FIG. 3.
Figure 5:
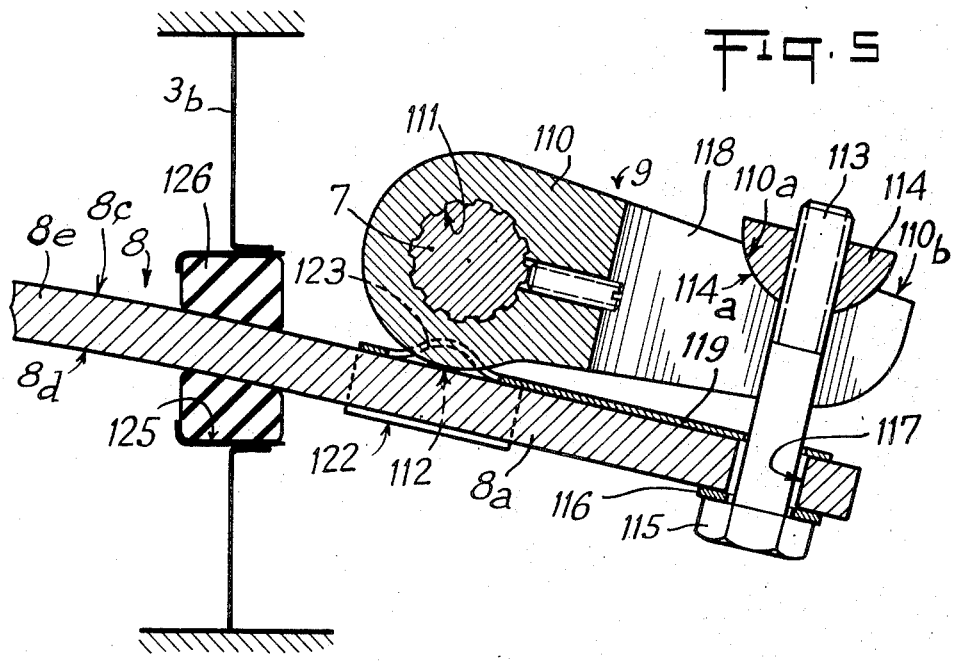
FIG. 5 is a section along V—V of FIG. 4.
Figure 6:
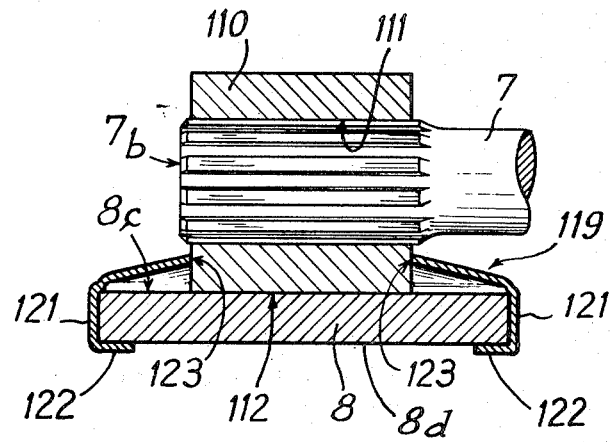
FIG. 6 is a section along VI—VI of FIG. 4.
Figure 7:
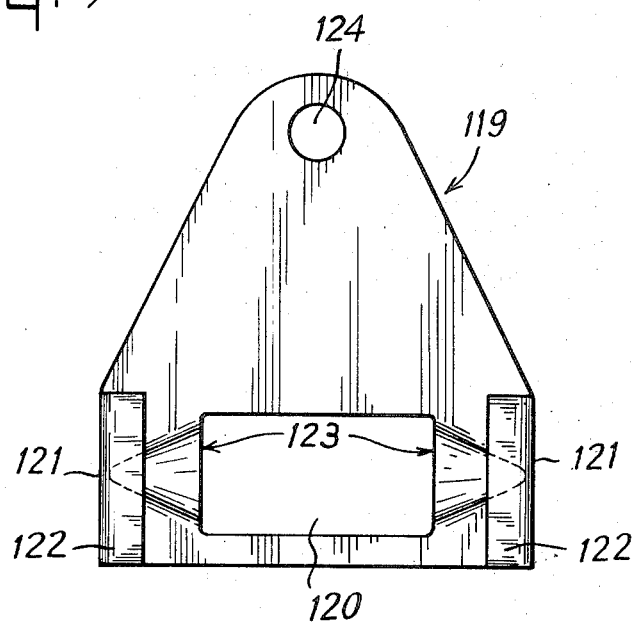
FIG. 7 is a plan view of a detail of the suspension shown in FIGS. 3 to 6.

The same general arrangement is adopted for the embodiment of FIG. 3, the elastic member then being constituted only by a single leaf 8. However, in the embodiment of FIG. 3, it could possibly comprise a plurality of leaves.

Figure 2:
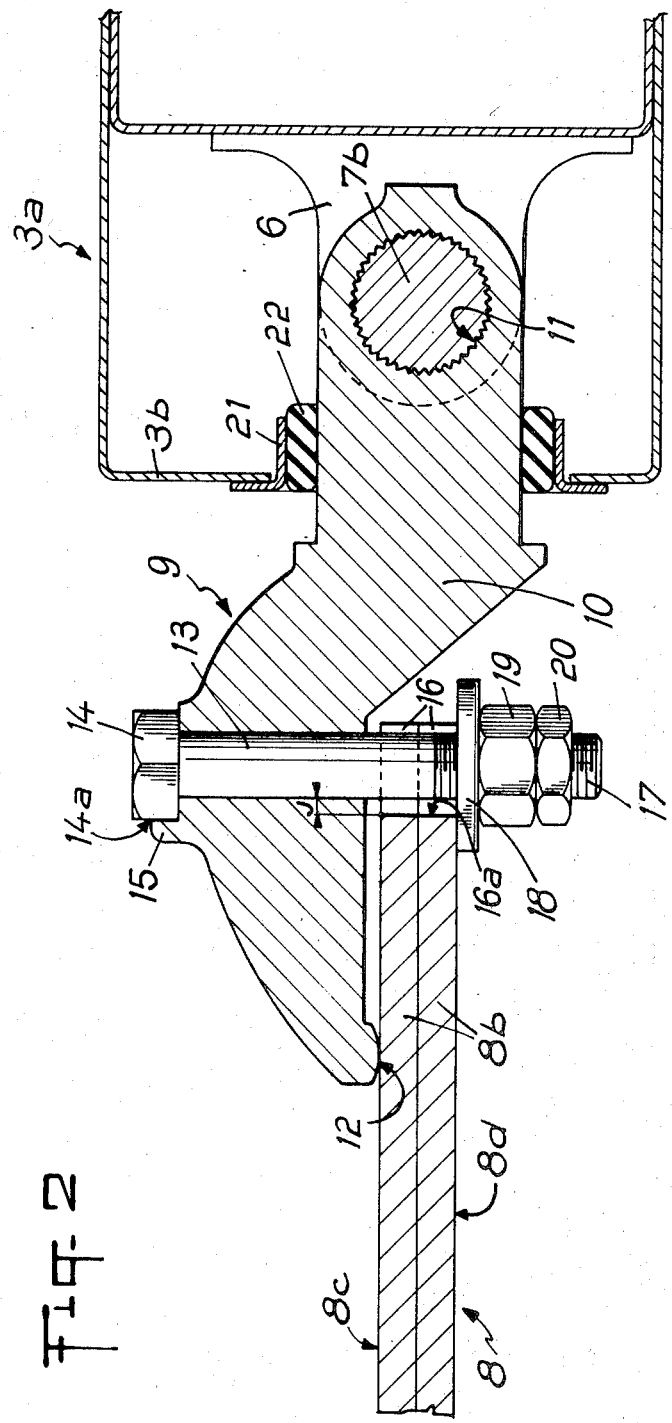
FIG. 2 is a section along II—II of FIG. 1.

It will also be specified that, in the example shown in FIGS. 1 and 2, the torsion bars 7 are disposed inside the side-members 3a, which are defined, on the side of the leaves 8, by a wall 3b.

Each device 9 is constituted by an arm 10 provided on the one hand with grooves 11 for fixing the end 7b of the corresponding torsion bar 7, on the other hand with a swell 12 forming a support for said arm 10 on the upper face 8c of the upper leaf 8. This device 9 also comprises a tie-rod 13, whose head 14 has a flat part 14a, said tie-rod passing through the arm 10, at right angles to the ends 8b of the leaves 8, substantially perpendicularly to the plane of said leaves 8. The arm 10 is, moreover, provided with a stop 15 with which the flat part 14a may cooperate in order to render integral in rotation the arm 10 and the tie-rod 13.

Notches 16 are made in the ends 8b of the leaves 8 and open out into the end part of said leaves. The tie-rod 13 passes through the notches 16. The end 17 of the tie-rod 13, opposite the head 14, is threaded and passes beyond the lower face 8d of the lower leaf 8. A support plate, constituted in the present case, by a washer 18, is interposed between said face 8d and a nut 19, screwed on the end 17 of the tie-rod 13. A counter-nut 20 cooperates with the nut 19 to ensure locking thereof.

It will be indicated that, as a variant embodiment, the notches 16 could be replaced by simple orifices. Moreover, a clearance J is made between the base 16a of said nothces 16 and the tie-rod 13.

Furthermore, the arm 10, which connects the end 7b of the torsion bar, located inside the side-member 3a, to the leaves 8, which are disposed outside said side-member 3a, must be able to pass through the wall 3b of this side-member. To this end, an opening is made in said wall 3b which is reinforced by a frame 21. The arm 10 traverses the wall 3b at the level of said frame 21 with interposition, between said frame 21 and itself, of a part 22 which is made of elastic material, for instance rubber, which forms a centering support.

In the embodiment shown in FIGS. 3 to 7, each device 9 is constituted by an arm 10 which is provided, on the one hand, with grooves 111 for fixing the end 7b of the corresponding torsion bar 7, on the other hand with a swell 112 capable of forming a support for said arm 110 on the upper face 8c of the leaf. This device 9 also comprises a tie-rod 113, of which one element 114 has a cylindrical face 114a. The face 114a cooperates with a likewise cylindrical recess 110a made in the upper face 110b of the arm 110 and of axis substantially parallel to the axis of the torsion bars 7. The tie-rod 113 furthermore possesses a head 115, opposite the element 114 and abutting, with interposition of a washer 116, on the lower face 8d of the elastic leaf 8.

The end 8a of the leaf 8 comprises an orifice 117 through which the tie-rod 113 is introduced. Furthermore, the arm 110 comprises two branches 118, the spacing of which is slightly greater than the diameter of the tie-rod 113, and between which this tie-rod 113 may be introduced.

It is further noted that a complementary part 119 is provided. It is obtained from a cut-out and folded plate in which a window 120 has been made, whilst flanged edges 121, themselves having bent-back portions 122, have been made respectively for being disposed opposite faces 8f of the leaf 8 substantially perpendicular to the torsion bars and the lower face 8d. Projections 123, forming stops, are integral with the upper face of the part 119 and are disposed on either side of the window 120. Finally, a hole 124 has been made in the end of the part 119.

The part 119 is placed in position by sliding it on leaf 8 so as to dispose the flanged edges 121 opposite the faces 8f and the hole 124 opposite the orifice 117 of the end 8a. The tie-rod 113 is concomitantly introduced in the hole 124 and orifice 117. In this configuration, the window 120 is oriented towards the central zone 8e of the leaf 8 and the swell 112 is located in said window opposite the projections 123.

It will be noted that the grooves 111 are substantially disposed at right angles to the swell 112 and consequently on the same side as this swell 112 with respect to the tie-rod 113.

In addition, the complete device 9 is located on a first side of the wall 3b of the side-member, the central zone 8e of the leaf 8 being located on the other side of the wall 3b. In order to allow the extension of the leaf 8 on either side of the wall 3b, an opening 125 has been made in said wall. An elastic bearing 126, for instance made of elastomer, is in fact interposed between the leaf 8 and the opening 125.

The advantages to be had from the constitution of the suspensions which have just been described will now be mentioned.

Concerning firstly the embodiment of FIGS. 1 and 2, the arm 10 comprises only one support swell 12, this rendering execution thereof very easy. The machining of this arm 10 is in fact limited to that of the grooves 11 and is considerably facilitated by the reduced size of said arm 10. Moreover, no particular machining is necessary in the support zone of the arm 10 on the part 22.

Other advantages of the small size of the arm 10 are its lightness and small bulk.

Furthermore, the mounting of the leaves 8 is effected simply by bringing the notches 16 of said leaves opposite the threaded ends 17 of the tie-rods 13, then by displacing said leaves parallel to the tie-rods 13 and concomitantly introducing said tie-rods in the notches 16. It is sufficient to position the washers 18 and nuts 19 and counter-nuts 20 to terminate assembly. The arms 10 may remain stationary, even when a leaf or leaves 8 are changed. This mode of mounting the leaves 8 is obviously very simple, in particular more simple than the prior known mountings which necessitated a combined presentation of the assembly of the leaves 8, arms similar to arm 10 and torsion bars, which, moreover, did not make adjustment easier.

On this subject, the embodiment of the suspension given in FIGS. 1 and 2 permits a very simple adjustment, by more or less tightening the nut 19. In this way, the leaves 8 are more or less fixed between the swells 12 and the corresponding washers 18 and consequently have a plurality of distinct operational characteristics.

Of course, it will have been understood that the presence of the clearance J enables the effects of dispersion of the dimensions of the different elements constituting the suspension and the dimension figures of mounting to be annulled.

Finally, each arm 10 is satisfactorily held on the side-member 3b, as well as the torsion bar associated therewith, by means of the corresponding elastic part 22.

In the embodiments of FIGS. 3 to 7, the grooves 111 and the swell 112 are generally disposed on the same side of the arm 110 with respect to the tie-rod 113. This arrangement is very advantageous, as it leads to the adoption, in a vehicle of given dimensions, of longer flexion leaves 8 than the leaves defined with regard to FIGS. 1 and 2. The increase in length is in fact approximately equal to the length of the arms 9 which, beforehand, were overhanging and extended the or each leaf 8. Now, this increase in useful length of the leaves 8 has increased the suppleness of said leaves, with constant section, or the suppleness is unchanged, but with increased section. It is by this means that only a single leaf has been able to be retained in the embodiment of the suspension.

Not only reduced cost price results from this arrangement, but also functional silence since leaf-on-leaf frictions are avoided.

From another point of view, a simple mounting of the arm 9 and the tie-rod 113 is proposed, the two branches 118 of the arm 9 being able to receive the tie-rod 113 by simple introduction. Of course, the face 114a of the element 114 of the tie-rod 113 may pivot freely in the recess 110a so that as a function of the pull of the arm 9 by the torsion bar 7, this arm 9 may render any arrangement free from support stresses with respect to the tie-rod 113.

It will also have been noted that the complementary part 119 is held in position on the leaf 8. In fact, the flanged edges 121 contain its displacement in the direction of the torsion bars 7, the bent portions 122 preventing the part 119 from lifting from the leaf 8, whilst finally the tie-rod 113 holds said part 119 in position in the direction parallel to the plane of the leaf 8. Consequently, the projections 123 do not risk losing contact with the sides of the swell 112 of the arm 9 introduced therebetween, and any relative movement exerted parallel to the axis of the torsion bars 7 is therefore stopped between the bars 7 and the leaf 8.

It has been seen that the leaf was partly supported, during its passage in opening 125, by the elastic bearing 126. It is therefore well guided and positioned with respect to the wall 3b of the side-member. Moreover, the interposition of the elastic bearing is such as to ensure a satisfactory filtering of the vibrations coming from the wheels which risk being transmitted to the wall 3b and thus to the structure of the vehicle.

Finally, it is noted that the torsion bars 7 which are no longer held by a bearing at the coupling ends with the elastic member, work partly in flexion and take a certain part of the load formerly supported by the elastic member alone: this results in a reduction in the compression undergone by this member and consequently a reduction of bulk in the central zone 8e of the leaf 8. The space thus rendered available, facilitates the passage of possible members such as exhaust conduits, for example.

The suspension described is applicable in particular to the manufacture of automobile vehicles.

What is claimed is:

1. A suspension of a group of wheels of a vehicle, comprising two wheels located respectively on either side of the longitudinal plane of the vehicle and two suspension devices, each comprising at least one torsion bar associated with one of the two wheels, each wheel being connected to one end of its suspension device, coupling means fixing an elastic member to each of the ends of the suspension device opposite the ends connected to the wheels, said coupling means including a part comprising two support elements between which the elastic member is disposed, means for fixing the suspension device in question to said coupling means, wherein the part comprising the two support elements includes an arm which is provided on the one hand with the fixing member, on the other hand with a swell constituting a first of the two elements for supporting said part on a first face of the elastic member, and by a tie-rod integral with the arm and provided with a shoulder which is spaced from the end of the arm provided with the swell and which constitutes the second of the two support elements supporting a second fact of the elastic member, each end of said elastic member being formed with means defining a passage by which the tie-rod penetrates through the elastic member, and said means defining said passage and said tie-rod being dimensioned to provide a clearance therebetween.

2. A suspension as claimed in claim 1, wherein said means defining a passage by which the tie-rod penetrates through the elastic member is a fork with two prongs, the distance between the inner faces of which are at least equal to the diameter of the tie-rod.

3. A suspension as claimed in claim 2, wherein the end of the tie-rod opposite the shoulder is provided with a head, one of the faces of which is cylindrical and cooperates with a cylindrical recess formed in the face of the arm opposite that provided with the swell and the axis of which recess is substantially parallel to that of the torsion bar.

4. A suspension of a group of wheels of a vehicle, comprising two wheels located respectively on either side of the longitudinal plane of the vehicle and two suspension devices, each comprising at least one torsion bar associated with one of the two wheels, each wheel being connected to one end of its suspension device, coupling means fixing an elastic member to each of the ends of the suspension device opposite the ends connected to the wheels, said coupling means including a part comprising two support elements between which the elastic member is disposed, means for fixing the suspension device in question to said coupling means, wherein the part comprising the two support elements includes an arm which is provided on the one hand with the fixing member, on the other hand with a swell constituting a first of the two elements for supporting said part on a first face of the elastic member, and by a tie-rod integral with the arm and provided with a shoulder which is spaced from the end of the arm provided with the swell and which constitutes the second of the two support elements supporting a second face of the elastic member, said fixing means being disposed on the arm on the same side as the swell with respect to the tie-rod.

5. A suspension as claimed in claim 4, wherein the fixing means is disposed substantially at right angles to the swell with respect to the first face of the elastic member.

6. A suspension of a group of wheels of a vehicle, comprising two wheels located respectively on either side of the longitudinal plane of the vehicle and two suspension devices, each comprising at least one torsion bar associated with one of the two wheels, each wheel being connected to one end of its suspension device, coupling means fixing an elastic member to each of the ends of the suspension device opposite the ends connected to the wheels, said coupling means including a part comprising two support elements between which the elastic member is disposed, means for fixing the suspension device in question to said coupling means, wherein the part comprising the two support elements includes an arm which is provided on the one hand with the fixing member, on the other hand with a swell constituting a first of the two elements for supporting said part on a first face of the elastic member, and by a tie-rod integral with the arm and provided with a shoulder which is spaced from the end of the arm provided with the swell and which constitutes the second of the two support elements supporting a second face of the elastic member, and a complimentary part is integral with the elastic member and comprises two stops between which the arm is inserted, so that the faces of the arm perpendicular to the torsion bar are disposed opposite said stops.

7. A suspension as claimed in claim 6, wherein the complementary part comprises two flanged edges which cover at least partially the two faces of the elastic member, substantially perpendicular to the torsion bar and is held in position on said member by means of the tie-rod itself.

8. A suspension of a group of wheels of a vehicle, comprising two wheels located respectively on either side of the longitudinal plane of the vehicle and two suspension devices, each comprising at least one torsion bar associated with one of the two wheels, each wheel being connected to one end of its suspension device, coupling means fixing an elastic member to each of the ends of the suspension device opposite the ends connected to the wheels, said coupling means including a part comprising two support elements between which the elastic member is disposed, means for fixing the suspension device in question to said coupling means, wherein the part comprising the two support elements includes an arm which is provided on the one hand with the fixing member, on the other hand with a swell constituting a first of the two elements for supporting said part on a first face of the elastic member, and by a tie-rod integral with the arm and provided with a shoulder which is spaced from the end of the arm provided with the swell and which constitutes the second of the two support elements supporting a second face of the elastic member, said elastic member extended on either side of at least one panel of the vehicle structure, such as the panel of a side-member, the panel being formed with an opening and an elastic bearing being interposed between the panel and said elastic member.

* * * * *

UNITED STATES PATENT OFFICE
CERTIFICATE OF CORRECTION

Patent No. 3,831,966　　　　　　　　　Dated August 27, 1974

Inventor(s) ALBERT GROSSEAU

It is certified that error appears in the above-identified patent and that said Letters Patent are hereby corrected as shown below:

Front page, at "[30]", insert second priority application as follows:

-- May 26, 1972　France ........... 72.19046 --.

Column 1, line 25, change "penion" to -- pension --.
Column 3, line 28, change "nothces" to -- notches --.
　　　　　　line 40, change "arm 10" to -- arm 110 --.

Signed and sealed this 26th day of November 1974.

(SEAL)
Attest:

McCOY M. GIBSON JR.　　　　　　C. MARSHALL DANN
Attesting Officer　　　　　　　Commissioner of Patents